United States Patent [19]

Vogt

[11] 4,421,471

[45] Dec. 20, 1983

[54] VIBRATING HYDRAULIC PRESS

[75] Inventor: Willy Vogt, Zürich, Switzerland

[73] Assignee: Bucher-Guyer A.G., Niederweningen, Switzerland

[21] Appl. No.: 421,951

[22] Filed: Sep. 23, 1982

Related U.S. Application Data

[62] Division of Ser. No. 250,233, Apr. 2, 1981.

[30] Foreign Application Priority Data

Apr. 11, 1980 [DE] Fed. Rep. of Germany ....... 3014068

[51] Int. Cl.$^3$ ......................... B28C 21/50; B29C 3/00

[52] U.S. Cl. .................................. 425/421; 425/135; 425/431; 425/432; 425/456

[58] Field of Search .................... 264/69, 72; 425/421, 425/432, 456, 457, 146, 149, 150, 135, 431; 100/269 B

[56] References Cited

U.S. PATENT DOCUMENTS 3,883,278 5/1975 Hass .................................. 425/421

FOREIGN PATENT DOCUMENTS 723824 2/1955 United Kingdom ................ 425/146

647112 2/1979 U.S.S.R. ............................. 264/269

*Primary Examiner*—Willard E. Hoag

*Attorney, Agent, or Firm*—Ernest F. Marmorek

[57] ABSTRACT

Apparatus for the manufacture of bricks with the aid of a mold normally open on top, ceramic material which may be introduced into the mold, and a piston disposed above the mold which may be moved with respect to the mold, and forms a cover surface of the mold when entering the top of the mold, includes the steps of exerting a non-oscillatory pressure by the piston on the ceramic material, and additionally exerting an oscillatory pressure on the ceramic material.

12 Claims, 11 Drawing Figures

VIBRATING HYDRAULIC PRESS

This is a division of application Ser. No. 250,233, filed Apr. 2, 1981, pending.

BACKGROUND OF THE INVENTION

In a method of the aforedescribed kind and an apparatus for carrying out the method, as taught in German laid-open patent specification DE-OS 27 41 800, published July 31, 1980, a mold containing ceramic material is hydraulically lifted for being acted upon by a quasi-static pressure, until the piston or the pistons which are mounted on a stationary press yoke have reached a previously adjusted end position in the mold.

In another method for the manufacture of fireproof bricks the ceramic material or sand contained in the mold is subjected to an impact force. The impact force may be obtained by a so called over-pressure hammer, or air hammer, or by means of a friction screw press.

Each of the known methods has specific disadvantages. In the methods using the quasi-static pressure, although the initial costs are relatively low, a limited homogeneity and density is obtained within the bricks when certain sand is used. If an over-pressure hammer, or air hammer is used for carrying out the method using impact pressure, the resultant homogeneity of the bricks, which have been manufactured, is much better, but in view of the high initial costs, and the long processing time, the manufacturing cost of the fireproof bricks is rather high. In view of the functioning of the over-pressure hammer, or the air hammer, the necessary forces are only obtained if the impact piston has a long stroke, or is allowed to fall from a considerable height. Further, in order to achieve the required homogeneity of the manufactured bricks, an impact energy is required, which can only be obtained by lifting the impact piston several times. If friction screw-presses are used, in view of the limited output of the drive, it is not only necessary to increase the processing time, but the pressure force is also limited in view of the inclination between the screw thread and the machine frame, so that the bricks are of a relatively low quality, in spite of the high manufacturing costs.

REFERENCE TO RELATED APPLICATIONS

Reference should also be had to the following pending patent applications of the inventor of the present invention, also assigned to the assignee of the present invention:

Application Ser. No. 74,974, filed Sept. 13, 1979, entitled "Press with easily exchangeable Proof Plates," and application Ser. No. 69,547, filed Aug. 24, 1979, entitled "Method and Apparatus for Manufacturing Hollow Bodies."

SUMMARY OF THE INVENTION

One of the principal objects of the invention is a method of the aforedescribed type for the manufacture of fireproof bricks, where a better homogeneity and a particularly high density is obtained in the manufactured bricks while reducing initial plant costs and processing time.

This object is attained by the manufacturing steps including exerting a non-oscillatory pressure by a piston on the ceramic material, and additionally exerting an oscillatory pressure on the ceramic material. The present manufacturing method ensures the manufacture of fireproof bricks having a high homogeneity and a high density in a relatively short time.

Further objects and advantages of the invention will be set forth in part in the following specification, and in part will be obvious therefrom without being specifically referred to, the same being realized and attained as pointed out in the claims hereof.

The basic inventive method of the invention is outlined in claim 1, while claims 2 through 6 recite various variants of the inventive method, which may be utilized in dependence of the type of sand used, and the dimensions of the bricks to be manufactured.

Main apparatus claim 8, and claims depending therefrom, recite an apparatus for carrying out the inventive method. It is to be particularly noted, that the inventive apparatus can be retro-fitted to existing presses operating with a quasi-static or non-oscillatory pressure. The inventive apparatus can be particularly installed in an apparatus of the aforedescribed kind, instead of the upper, stationary piston normally used.

BRIEF DESCRIPTION OF THE DRAWINGS

For a fuller understanding of the nature and objects of the invention, reference should be had to the following detailed description, taken in connection with the accompanying drawings in which.

DESCRIPTION OF THE PREFERRED EMBODIMENTS

Figures 1A, 1B, 1C, 1D, 1E, 1F, 1G, 1H:
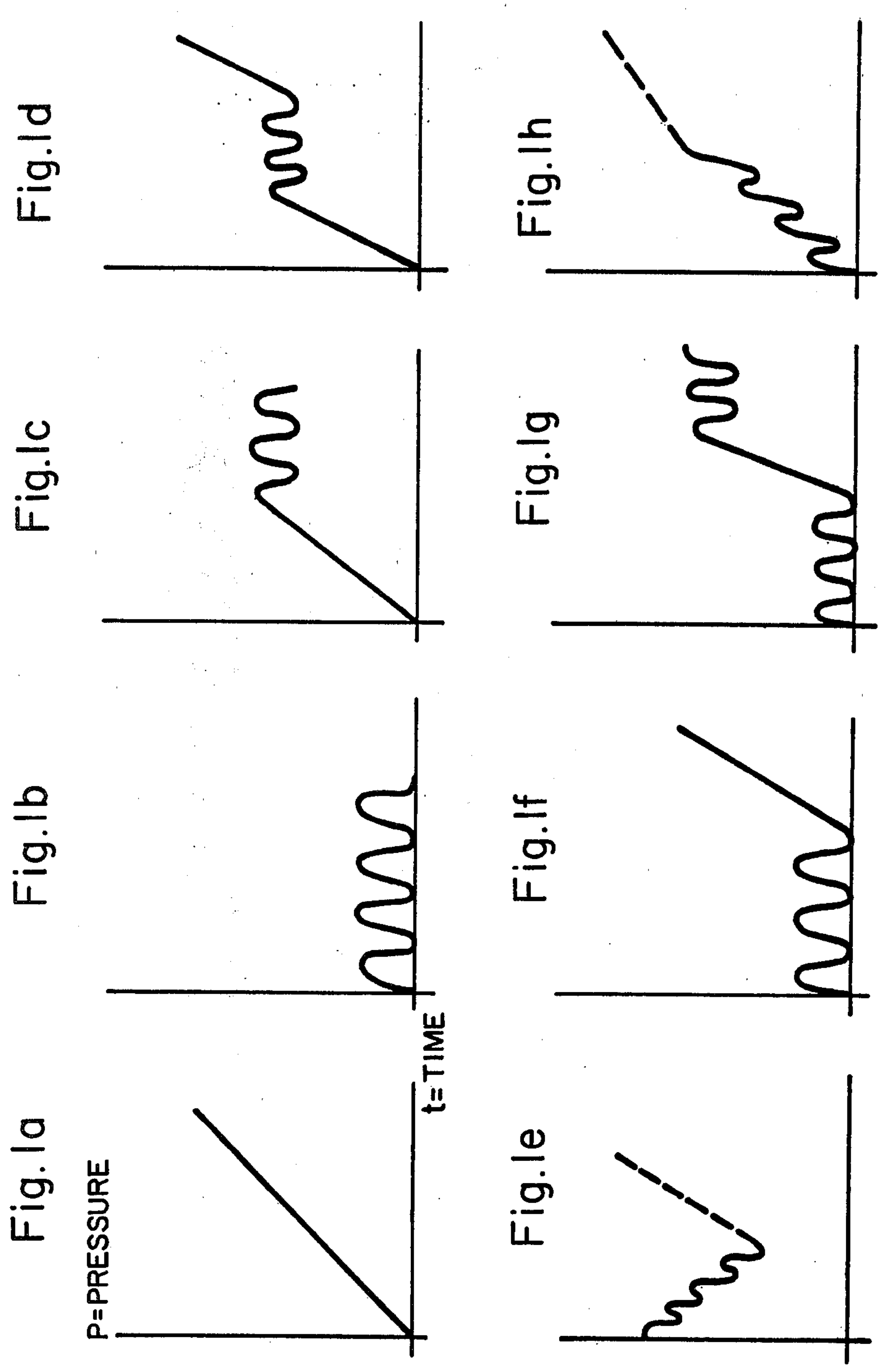
FIG. 1*a* is a time relationship of a non-oscillatory pressure of the prior art.
FIG. 1*b* is a time relationship of a typical oscillatory pressure exerted by the piston of the present invention.
FIG. 1*c* is a time relationship of a typical non-oscillatory pressure exerted by the piston of the present invention, followed by exerting an oscillatory pressure.
FIG. 1*d* is a time relationship of a non-oscillatory pressure exerted by the piston of the present invention of the ceramic material, followed by a period of exerting oscillatory pressure on the material, which is again followed by a period of exerting non-oscillatory pressure on the ceramic material.
FIG. 1*e* is a timing diagram where an oscillatory pressure is superimposed on a time-wise decreasing non-oscillatory pressure, followed by optional exertion of a gradually increasing non-oscillatory pressure.
FIG. 1*f* is a timing diagram of oscillatory pressure exerted on the ceramic material, followed by a period of time-wise increasing non-oscillatory pressure.
FIG. 1*g* is a timing diagram of an oscillatory pressure exerted on the ceramic material, followed by a period of time-wise increasing non-oscillatory pressure, followed in turn by a time period of superimposing an oscillatory pressure on the stationary non-oscillatory pressure.
FIG. 1*h* is a timing diagram of a non-oscillatory pressure increasing as a function of time, on which there is superimposed an oscillatory pressure, with an optional time period of time-wise increasing non-oscillatory pressure.

In carrying the invention into effect, and referring in particular to FIG. 1, pressure versus time diagrams for various variants of the method for manufacturing fireproof bricks are shown. FIGS. 1*a* and 1*b* illustrate pressure as a function of time of the prior art; in particular FIG. 1*a* is a pressure v. time diagram of an increasing quasi-static or non-oscillatory pressure, and FIG. 1*b* is a timing diagram of an idealized case where an impact pressure method or process is being used. FIGS. 1*c* through 1*h* illustrate, by way of example, various variants of the claimed processes for the manufacture of fireproof bricks. In a method of this type it is possible to pre-densify the ceramic sand initially by means of a quasi-static or non-oscillatory pressure, as shown in FIG. 1*c* through 1*e*, and to add or superimpose the dynamic or oscillatory pressure while the static, or non-oscillatory pressure remains stationary, as shown, for example in FIGS. 1*c* and 1*g*, or when the static, or non-oscillatory pressure decreases, as shown, for example, in FIG. 1*e*. Following exertion of the dynamic or oscillatory pressure, the manufacturing process may come to an end, as shown in FIG. 1*c*, or it is possible to further increase the static or non-oscillatory pressure as a function of time, as shown, for example, in FIGS. 1*d* and 1*e*. It is alternately also possible to first exert the dynamic or oscillatory pressure as shown, for example in FIGS. 1*f* and 1*g*, followed by a static or non-oscillatory pressure. It is also possible to superimpose the dynamic or oscillatory pressure onto the static or non-oscillatory pressure, as shown, for example in FIG. 1*h*. Which of the illustrated or other possible variants of the method are used, depends largely of the type of the ceramic sand used, and on the mold for the fireproof bricks. By means of these several variants, it is, however, possible to manufacture fireproof bricks having an excellent homogeneity and high density even under relatively unfavorable conditions of the sand or material, or the mold.

Figure 2:
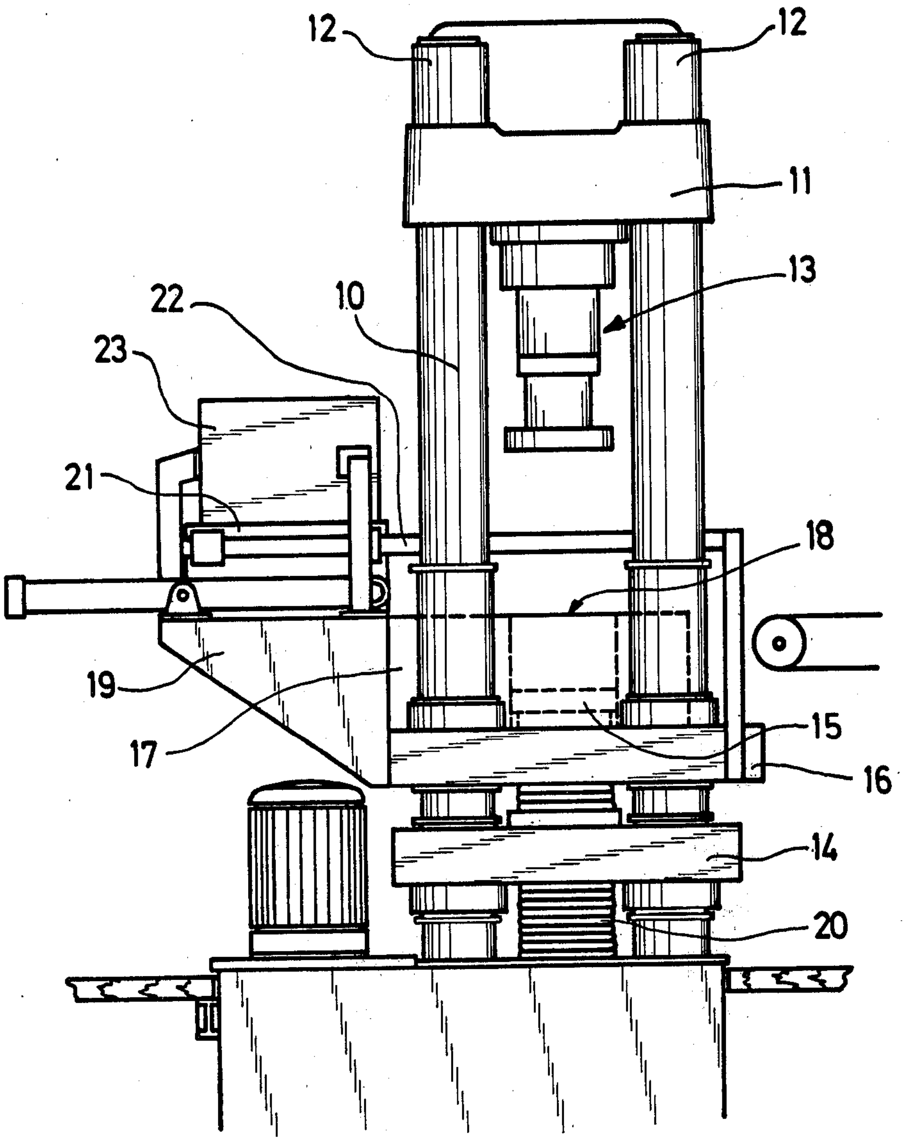
FIG. 2 is a side view of the press of the present invention.

FIG. 2 shows, by way of an example, an apparatus for carrying out the method illustrated with the aid of FIG. 1; specifically FIG. 2 is a side view of a hydraulically operable press for bricks using four columns. At the top end of columns 10 there is disposed a yoke 11, which is secured by nuts 12 threaded onto columns 10, limiting the upper excursion of piston 13. The main or upper piston 13 is arranged in the center of the yoke 11 and projects downwardly. In a known press of the prior art, which generally corresponds to the press shown in FIG. 2, with the exception of the main piston 13, the upper or main piston is stationary. The special embodiment of the piston 13 in the apparatus of the present invention, which makes it possible to carry out the method illustrated in FIG. 1, will be explained in what follows with the aid of FIGS. 3 and 4. A press plate 14 displaceable vertically along the columns 10 is shown at the lower end of the columns 10, and an upright piston 15 is secured in the center of the press plate 14. A carrier plate 16, which may be also displaced along the columns 10, is disposed above the press plate 14, and carries a mold 17. The mold 17 is formed with a hollow space 18, and has a floor which is formed by the lower piston 15. Next to the mold 17 and external of the columns 10, there is disposed a support 19, which is connected to the carrier plate 16, and which carries a hydraulic system for horizontal displacement of a material container 21, which is open at its top and bottom, and guided by guide rods 22. There is furthermore provided on the support 19 a filling funnel 23 for filling the material container 21. In order to fill the hollow space 18, the mold 17 can be oriented with respect to the support 19, so that the mold 17 and the support 19 form a common table, on which the material container 21 may be displaced from the filling funnel 23 towards the hollow space 18. By means of a programmable first hydraulic drive means 20 the press plate 14 may be moved towards the carrier plate 16, or it may be moved jointly with the carrier plate 16 towards the upper or main piston 13, so that the sand is densified by a quasi-static or non-oscillatory pressure.

Figure 3:
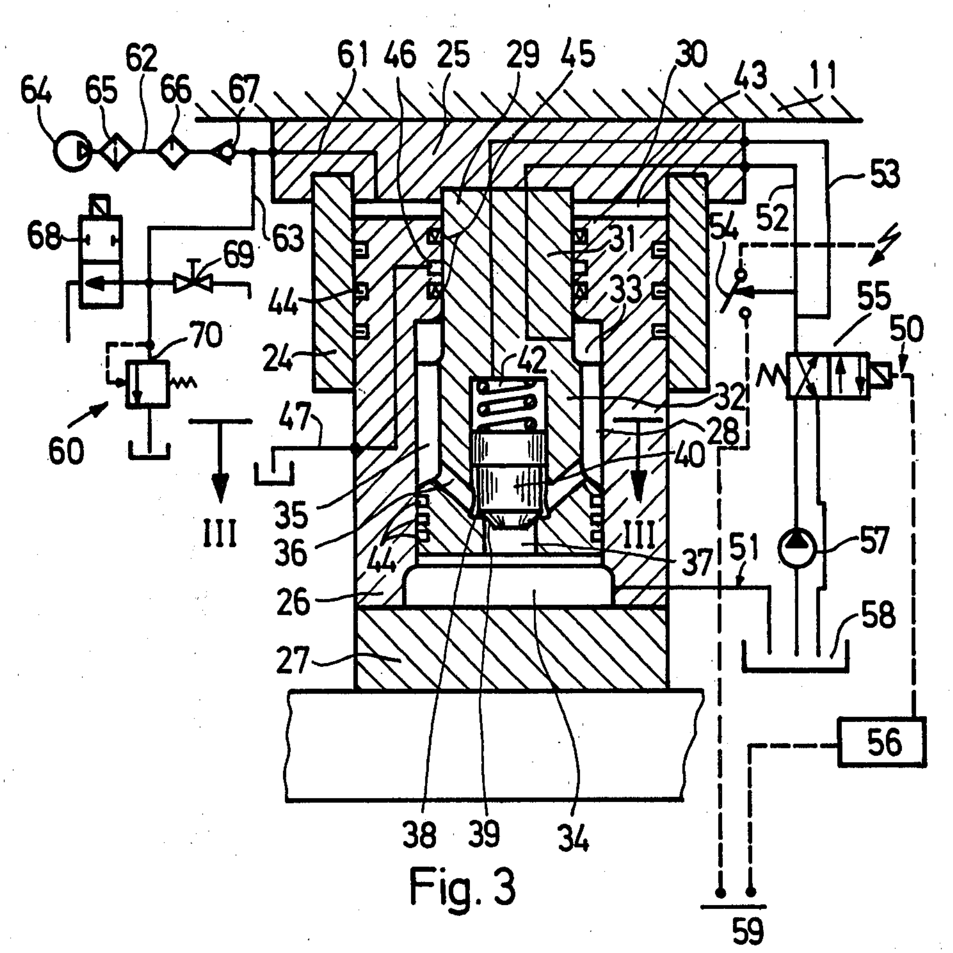
FIG. 3 is a cross-section of the main or main piston of the press shown in FIG. 2.

FIG. 3 illustrates the implementation of the main or upper piston 13, as well as its associated pressure control. The upper or main piston 13 passes through a cylindrical sleeve 24, which extends in the direction of the piston stroke, and is connected to an impact plate 25 rigidly secured to the yoke 11. The upper piston 13 consists of an impact piston 26, and an impact piston plate 27, and is formed in the interior thereof with a substantially cylindrical chamber 28. The upper or main piston 13 is secured from moving out of the sleeve 24 by a control piston 29, which extends into the cylindrical chamber 28 through a bore 30 formed in the upper portion of the impact piston 26. The control piston 29 includes a shaft 31, and a lower portion 32 exceeding in cross section that of the shaft 31. The cylindrical hollow chamber 28 is thus subdivided into an upper compression chamber 33, and a lower expansion chamber 34, which expansion chamber 34 is formed substantially by the lower side of the control piston 29, the impact piston 26, as well as the inner side of the impact piston plate 27. The compression chamber 33 communicates through longitudinal grooves 35 formed in a lower portion of the control piston 29 and channels 36 with an outlet 37 and/or a control chamber 38. The outlet 37 communicating with the expansion chamber 34 may be closed through a conical end 39 of a check valve 40. The check valve 40, which is implemented as a differential piston, and which has two different diameters at the top and bottom, respectively, may be actuated through a fluid disposed in a fluid chamber 41, which is formed in the control piston 29, and may be additionally actuated by a compression spring 42 also disposed in the fluid chamber 41. The control of the check valve 40 will be explained later. In addition to the compression chamber 33 and the expansion chamber 34, in the implementation described of the main piston 13 and its guidance, there is additionally provided an enclosure 43, which is formed by the cylindrical sleeve 24, the impact plate 25, a surface of the impact piston 26, as well as by the outer peripheral surface of the shaft 31 of the control piston 29, and which enclosure 43 serves as energy storage means.

The various chambers are sealed from another and from the atmosphere by respective packing rings being disposed in circumferential grooves of the impact piston 26. In the implementation of the example shown, both the outer surface of the impact piston 26 within the region of the cylindrical sleeve 24, as well as the lower portion 32 of the control piston 29 are formed with circular grooves 44, which are disposed one above the other. On the inner periphery of the impact piston 26, which has a bore for the control piston 29, there are also formed at least two circumferential grooves 45 in which there are arranged packing rings. A further circumferential groove 46 is disposed between the two circumferential grooves 45, and their associated packing rings, which circumferential groove 46 communicates with a leakage conduit 47 for receiving any fluid leakage. This makes it possible both for the bore 30, as well as for the shaft 31 to have a relatively large tolerances. This is advantageous as far as the manufacturing costs of the brick press are concerned, but is also advantageous in resulting in a long economical life of the brick press of the present invention.

The pressure in the compression chamber 33 and in the expansion chamber 34 is controlled by means of hydraulic drive means 57. For this purpose hydraulic conduits 51, 52 and 53 extend outwardly from the expansion chamber 34, from the compression chamber 33, and from the fluid chamber 41, respectively. The hydraulic conduit 52, which communicates with the hydraulic conduit 53, and is connected to a pressure switch 54, communicates with a 4/2 fluid switch 55. This 4/2 fluid switch 55 is controlled by a control 56, and communicates on its output side with a pump 57 as well as a fluid container 58. The hydraulic conduit 51 extending from the expansion chamber 34 also communicates with the fluid container 58. The control 56 is actuated by the pressure switch 54 through a proximity switch 59. The proximity switch 59 is only closed, when the mold 15 is lifted. This avoids an idle stroke of the upper, or main piston 13, which otherwise could damage the press.

Pneumatic control means 60 control the pressure in the enclosure 43, which in turn communicates with the conduit 61. External to the impact plate 25, the conduit 61 branches into an air supply conduit 62, and an air discharge conduit 63. Compressed air is supplied to the enclosure 43 through the air conduit 62. Alternatively however, it is also possible to suck atmospheric air into the enclosure 43 through the impact piston 26, so as to avoid installation of a compressor. In passing from the source of air to the enclosure 43, the air conduit 62 may include a filter 65 and/or a lubricant 66. A check valve 67 follows the lubricant 66.

The air discharge conduit 63 includes a 2/1 fluid switch 68, actuated by an electromagnet. This switch 68 also serves as a safety arrangement during the setting up of the brick press in its open state. A manual valve 69 in the air discharged conduit 63 is then activated, if the 2/1 fluid switch 68 drops out, or if the conduits must be discharged by discharging condensed water which is being formed therein. A pressure limit switch 70 built into the air discharge conduit 63 serves to limit the pressure in the event of a defective pressure switch 54, or of other faults in the hydraulic drive means 57.

Figure 4:
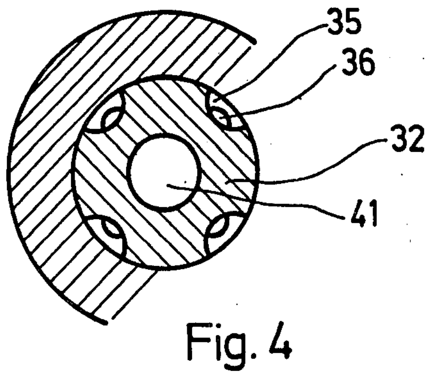
FIG. 4 is a cross section along the line III—III of FIG. 3.

FIG. 4 is a cross section of the control piston 29. There are clearly shown the longitudinal grooves 35, the channels 36 communicating therewith, as well as the fluid chamber 41, within which the check valve 40 moves.

The operation of the press of the present invention will now be described.

Prior to the press operations proper the material container 21 takes up the position illustrated in FIG. 2. It is disposed on the support 19 rigidly connected to the press. Above the material container 21 there is disposed a filling funnel 23, which guides the ceramic mass from the (non-illustrated) supply container into the material container 21. The material container 21 is implemented in the shape of a frame, namely it is open both on top and on the bottom. If the material container 21 is filled with the ceramic mass, it is guided by the hydraulic drive from the support 19 to the mold 17, which support 19 and mold 17 are situated on a common plane. The lower piston 15 forming the floor of the hollow space 18 is now lifted, until it reaches the upper side of the mold 18, by the hydraulic drive means 20. If subsequently the lower piston 15 is lowered, then the material container 21 is discharged, and the hollow space 18 is filled. Upon the return of the material container 21 to its initial position, any redundant ceramic mass is removed by the wiping action of the material container 21, so that the ceramic mass is flush with the upper rim of the mold. The material container 21 then moves to its initial position under the filling funnel 23.

For the purpose of the discussion which follows, assume that the process shown in FIG. 1c is being used. The press plate 14, and the carrier plate 16 are driven at increased velocity together towards the upper or main piston 13. Just before the first press position is reached, this velocity is reduced. From this point onwards the mold 18 is driven upwardly at a lower velocity, the so-called compression velocity, with the aid of the first hydraulic drive means 20. If the upper or main piston 13 has reached a position corresponding to a prearranged pressure in the mold 18, the proximity switch 59 of the second hydraulic drive means 57, and the pneumatic control means 60 is actuated in a manner not further illustrated. Following switch-over of the 4/2 fluid switch 55 from its rest position to its operating position by the control 56, the pump 57 supplies fluid through the 4/2 fluid switch 55 into the conduits 52 and 53. By this means, on the one hand, the impact piston 26 arranged slideably in the cylindrical sleeve 24 is lifted upwardly by the incoming fluid into the upper compression chamber 33, and on the other hand the check valve 40 closes the outlet 37 of the control piston 29, as the force developed in the control chamber 38 acting on the annular surfaces of the check valve 40 is smaller than the force acting on the check valve 40 on the side opposite thereto. Due to the lifting of the upper or main piston 13, the air present in the enclosure 43 is compressed, and consequently stored as driving energy. If the stored energy or the pressure in the conduit 52 reaches a predetermined value, then the pressure switch 54 is opened, and the 4/2 fluid switch returns to the initial position shown. The fluid then returns to the fluid container 58. In view of the relief of pressure in the fluid chamber 41, the check valve 40, upon being acted upon by the now higher pressure within the compression chamber 33, is made to travel downwardly, so that the fluid streams through the outlet opening 30 in the expansion chamber 34, and therefrom through the hydraulic conduit 51 into the fluid container 58. The conduit 52 communicates with the compression chamber 33 in such a manner that it is immediately closed following relief of the pressure, so that the return of the fluid is accomplished quickly.

In this manner the force resulting from the energy stored in the enclosure 43, and acting in the direction of compression, is no longer compensated by a fluid force acting opposite to the direction of compression, so that a dynamic or oscillatory pressure results.

The pressure switch 54 returns shortly after the relief of pressure in the conduits 52 and 53 to its closed position. Thus the preconditions for a change of position of the 4/2 fluid switch 55 are fulfilled. The impact cycle is, however, determined by the precoupled control 56, which is adjustable according to the chosen method, the geometry of the mold, and the properties of the ceramic mass. The pneumatic control means 60 may exert an additional static or non-oscillatory pressure on the upper or main piston 13. It further serves as a safety arrangement in the event of any faulty manipulation of the second hydraulic drive means 57 during the time that the press is being set up.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A press for the manufacture of fire bricks, comprising in combination:

a mold, including a bottom normally open on top, and adapted to receive ceramic material, a main piston disposed normally in an initial position above said mold, and forming a cover surface of said mold when entering the top of the mold, drive means in driving connection with said main piston for urging said main piston to exert a non-oscillatory pressure onto said ceramic material, said main piston being displaceable by said drive means from said initial position in a direction towards the bottom of said mold, said drive means being hydraulic and being associated with pneumatic energy storage means for urging said main piston toward the bottom of the mold, the hydraulic drive means also being connected for urging the main piston in a direction away from the bottom of the mold and control means for controlling fluid supplied by said hydraulic drive means to provide oscillating pressure on said main piston.

2. A press as claimed in claim 1, wherein said drive means are fluid-operable first drive means, and further comprising:

a plate, said main piston making contact with said plate in said initial position, a sleeve mounted on said plate, and wherein said main piston has a chamber and is movable in said sleeve towards, and away from the bottom of said mold, and wherein the cover surface of said main piston, the inner periphery of said sleeve, and the plate form an enclosure for receiving a fluid, and acting as energy storage means, a control piston mounted on said plate, projecting into the chamber of said main piston, and defining a pressure region therein, second drive means for generating a fluid pressure in said pressure region, whereby, upon the fluid being admitted into said pressure region, said main piston is urged by said second drive means through said fluid to move in a direction away from the bottom of said mold.

3. A press as claimed in claim 2, wherein said control piston has an upper chamber, and includes a lower portion having a fluid chamber, and further comprising hydraulic conduit means connected to said upper chamber and to said fluid chamber, and wherein said control means is a pressure switch connected to said hydraulic conduit means.

4. A press as claimed in claim 2, wherein a predetermined fluid pressure prevails in said enclosure, and further comprising pneumatic control means for controlling the pressure in said enclosure.

5. A press as claimed in claim 4, further comprising a proximity switch adjustably closeable in dependence of the desired penetration of said piston into said mold for controlling said second drive means and said pneumatic control means, so that said second drive means and said pneumatic control means are only activated when said proximity switch is closed.

6. A press as claimed in claim 2, wherein said chamber is substantially a cylindrical chamber, and wherein said control piston has a control chamber, and includes a lower portion subdividing said cylindrical chamber into an upper chamber, and an expansion chamber, an outlet of said cylindrical chamber communicating with said expansion chamber, the lower portion of said control piston defining a plurality of longitudinal grooves and channels communicating with said control chamber, and further comprising a controllable check valve, said outlet being closable by said check valve.

7. A press as claimed in claim 6, wherein said control piston has a fluid chamber, and further comprising spring means for exerting pressure on said check valve.

8. A press as claimed in claim 6, wherein said check valve is a fluid-operable differential piston, and further comprising fluid-drive means for operating said check valve.

9. A press as claimed in claim 8, wherein the lower portion of said control piston has a fluid chamber, the downstream end of said check valve bordering said fluid-chamber, and wherein said fluid-drive means includes a pump, a fluid-container in communication with said pump, a fluid switch, a first fluid conduit connected to said fluid switch and to said upper chamber, a second fluid conduit connecting said upper chamber to said fluid-container, and wherein a third fluid conduit connects said expansion chamber to said fluid-container.

10. A press as claimed in claim 6, wherein said main piston defines a bore for receiving a shaft of said control piston, first and second circumferential grooves being defined on the inner periphery of said main piston, and further comprising a plurality of packing rings received in said grooves, respectively, for sealing said enclosure from said upper chamber.

11. A press as claimed in claim 10, wherein a third circumferential groove is defined between said first and second grooves in said main piston, and further comprising a leakage conduit disposed in said third groove for the discharge of any fluid leaked from said main piston.

12. A press as claimed in claim 10, wherein said main piston includes an impact piston and an impact piston plate making contact with said impact piston, said impact piston defining said bore, and wherein said circumferential grooves are defined on the inner periphery of said impact piston.

* * * * *